United States Patent [19]

Stern

[11] 3,885,107

[45] May 20, 1975

[54] PERMANENT SIGNAL LOCKOUT INTERFACE CIRCUIT

[75] Inventor: Mark Charles Stern, New York, N.Y.

[73] Assignee: American Telephone and Telegraph, New York, N.Y.

[22] Filed: May 6, 1974

[21] Appl. No.: 467,101

[52] U.S. Cl. .............................................. 179/18 FA

[51] Int. Cl. .............................................. H04m 3/00

[58] Field of Search.......... 179/18 F, 18 FA, 19, 20, 179/21, 22; 307/238, 259, 252 R

[56] References Cited

UNITED STATES PATENTS

| | | | |
|---|---|---|---|
| 3,132,264 | 5/1964 | Dahme | 307/238 |
| 3,258,613 | 6/1966 | Felchek | 307/252 R |
| 3,337,692 | 8/1967 | Bruglemans | 179/18 F |
| 3,378,642 | 4/1968 | Gagnier | 179/18 F |
| 3,581,117 | 5/1971 | Dixon | 307/252 R |
| 3,705,959 | 12/1972 | Swanson | 179/18 F |

*Primary Examiner*—Thomas A. Robinson
*Attorney, Agent, or Firm*—H. R. Popper

[57] ABSTRACT

In crossbar switching systems, permanent signal handling arrangements have been developed which disconnect the line relay from its associated line without operating any of the line switch circuitry. As a result of this type of operation the circuitry usually used to make no-test calls cannot be used to test a permanent signaling line when the permanent signal arrangement is in operation. An interface circuit is disclosed which makes the permanent signaling line appear idle when a no-test call is attempted. The normal circuitry of the line switch is modified to ground the sleeve lead through a low resistance during a normal busy condition and a high resistance during a permanent signal busy condition. When a no-test call is attempted the interface circuitry shunts the sleeve lead to negative battery drawing current through the grounding resistance. If the associated line is in a normal busy condition the sleeve lead remains near ground potential due to the low resistance. If, however, a permanent signal condition is present the potential on the sleeve lead is lowered below a predetermined threshold voltage causing the interface circuitry to make the line appear idle.

11 Claims, 2 Drawing Figures

PERMANENT SIGNAL LOCKOUT INTERFACE CIRCUIT

BACKGROUND OF THE INVENTION

This invention relates to the handling of permanent signal lines in communication systems and, in particular, to arrangements for testing permanent signal lines in crossbar switching systems.

In the course of maintenance activities in a crossbar switching office, it is desirable to place test calls from a central testing facility to any line which is indicating a trouble condition. Such calls are typically termed no-test calls and are made by maintenance personnel or operators through special testing circuitry which is normally found in the switching system. In the course of making such a no-test call to a particular line, the line is first checked to determine whether it is busy or idle. If the line is idle, connection is made to the line through the switching network in a normal manner. If the line is busy, connection is made to the line through a special portion of the line switch called the no-test vertical. In order to use the no-test vertical, the marker first determines which junctor the line to be tested is connected to and then operates the line switch to connect the no-test vertical to the line.

Certain arrangements for handling permanent signal conditions have been developed which disconnect the line relay from a permanent signaling line without operating any switching circuitry in the system. An example of such a permanent signaling handling arrangement is disclosed in my copending application, Ser. No. 412,635, filed Nov. 5, 1973. When one of these permanent signaling handling arrangements is in operation, the normal no-test procedure cannot be used to test the permanent signaling line because the operated permanent signal arrangement makes the permanent signaling line appear busy, however, no circuitry is operated in the switching system. Therefore, when the marker attempts to identify the line to which a no-test call is to be made (the normal procedure when a test call is to be placed to a busy line by means of the no-test vertical), the identification test fails and the marker cannot complete the call.

Therefore, there appears to be a need for an interface arrangement which can adapt permanent signal handling arrangements which disconnects the line relay without operating any switching circuitry to the normal no-test call handling procedures. Accordingly, it is an object of the present invention to provide an interface circuit which will adapt a permanent signaling handling arrangement which does not operate switching circuitry during a lockout condition to a standard no-test handling arrangement.

It is a further object of the present invention to serve as an interface with the marker busy and idle test circuitry for busy and idle signals generated by such a permanent signal handling arrangement.

SUMMARY OF THE INVENTION

The foregoing and other objects are achieved in accordance with the principles of the present invention in one illustrative embodiment thereof wherein a permanent signaling handling arrangement such as that disclosed in my prior application, Ser. No. 412,635, is adapted to be tested by the normal no-test operation of a crossbar switching system by means of an interface circuit which is inserted in series with the sleeve lead and the marker busy and idle test relays. Specifically, the interface circuit includes a voltage discriminator circuit consisting of two saturating amplifiers which convert the busy and idle signals produced by the permanent signaling handling arrangement to the normal battery and ground signals recognized by the marker busy and idle test relays. In addition, a silicon controlled rectifier (SCR) is connected in series with a transistor to negative battery. The transistor is rendered conductive during a no-test call to enable the SCR. If either a normal busy signal or a permanent busy signal is present at the output of the voltage discriminator circuit, the SCR is triggered to connect a shunt resistor from the sleeve lead to negative battery. During the normal operation of the permanent signal lockout circuit of application Ser. No. 412,635, the impedance of the sleeve lead to ground will be a low resistance if the busy signal on the sleeve lead is a normal busy signal. Consequently, the placing of the shunt resistance from the sleeve lead to negative battery will not appreciably change the ground potential on the sleeve lead. The voltage discriminator will therefore continue to forward a busy condition to the marker. If, however, the busy condition on the sleeve lead is due to a permanent signaling busy condition, the impedance of the sleeve lead to ground will be a high resistance. In this case, the placing of a shunt resistor from the sleeve lead to negative battery will cause the potential on the sleeve lead to decrease substantially. The voltage discriminator circuit responds to this decrease by changing the busy signal to the marker busy test relay to an idle indication. The change from a busy condition to an idle condition during a no-test operation occurs in a time which is sufficiently fast so that the marker busy test relay does not respond. Consequently, the marker sees the permanent signaling line as idle and proceeds to place a test call through the normal switching channels rather than attempting to connect through the no-test vertical.

DETAILED DESCRIPTION

Figure 1:
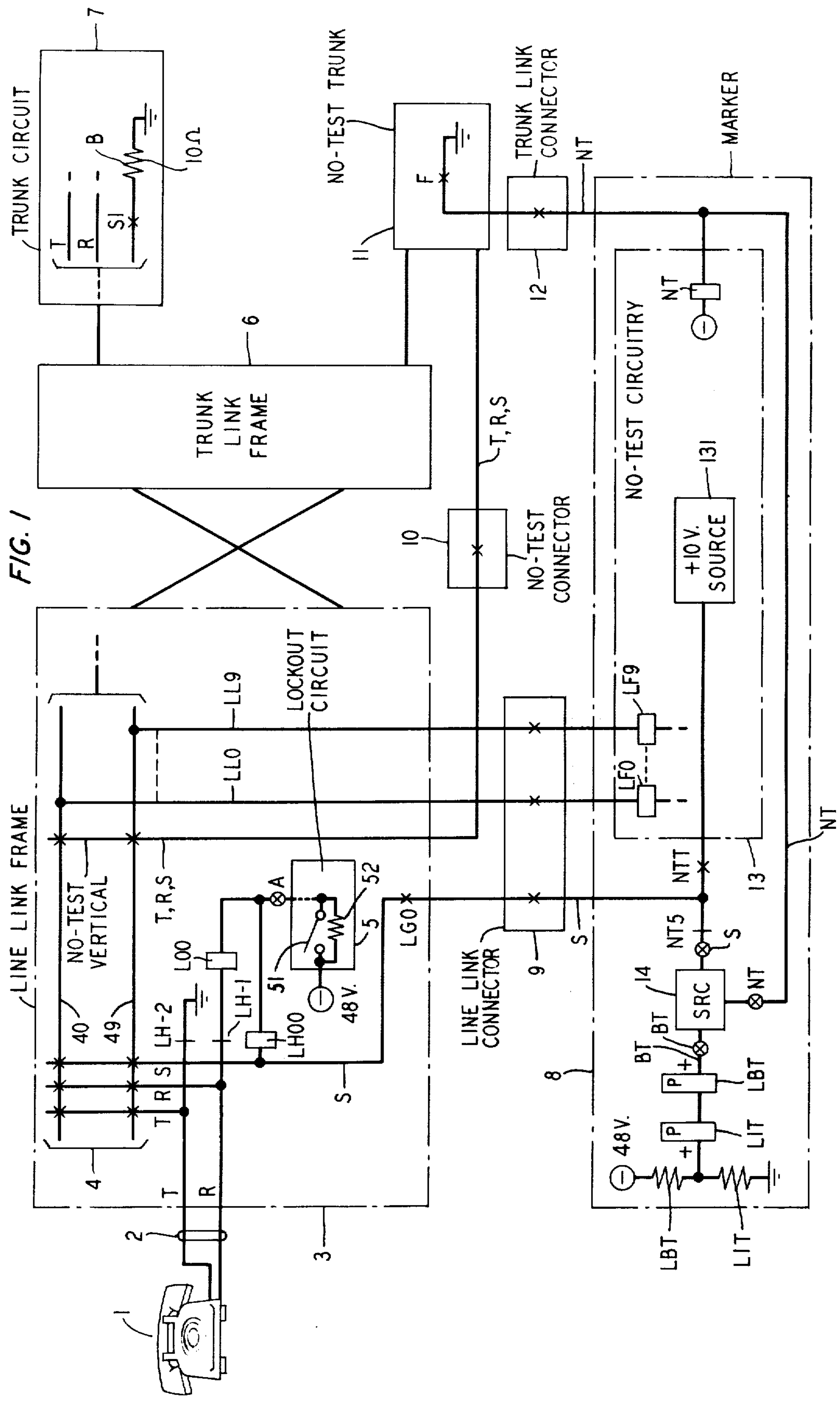
FIG. 1 of the drawing discloses a specific embodiment of my invention as incorporated into a crossbar switching system of the type described in U.S. Pat. No. 2,585,904, issued to A. J. Busch on Feb. 19, 1952 in order to provide no-test capabilities for the permanent signaling arrangement. In addition, the system has been modified to provide for permanent signal handling capabilities by the addition of a line lockout circuit such as that described in my copending application Ser. No. 412,635.

FIG. 1 of the drawing shows a crossbar switching system as described in the aforementioned Busch patent. By a series of well-known operations, stations such as station set 1 may be connected to other stations (not shown) or to trunks such as trunk circuit 7 via line 2, line link frame 3, and trunk link frame 6 operating under control of marker 8.

Line 2 has been equipped to service permanent signal conditions by the addition of permanent signal lockout circuit 5 which is preferably a circuit such as that disclosed in my copending application Ser. No. 412,635 filed Nov. 5, 1973. The circuitry and operation of lockout circuit 5 are described in detail in application Ser. No. 412,635, and for purposes of explanation lockout circuit 5 has been represented symbolically in FIG. 1 of the drawing by switch 51 in parallel with resistor 52. Switch 51 corresponds to device SCR1 in the drawing of application Ser. No. 412,635, resistor 52 corresponds to resistor R1 in the drawing of application Ser. No. 412,635, and terminal A corresponds to terminal A in the drawing of application Ser. No. 412,635.

In addition the circuitry of line link frame 3 has been further modified to provide for busy test and no-test capabilities of line 2, which is equipped with lockout circuit 5. In particular, the winding of hold magnet LHOO, in line link frame 3, which is normally connected directly to negative battery potential, has been connected to the winding of line relay LOO which in turn has been connected to terminal A of lockout circuit 5 as shown in FIG. 1 of the drawing.

In the course of an intraoffice call, for example, a calling station set may be connected to a trunk circuit such as trunk circuit 7 through line link frame 3 and trunk link frame 6 via operations described in the Busch patent at column 6 lines 40 et seq. Marker 8 then proceeds to establish a path between trunk circuit 7 and the called station by means of a callback operation which is described in detail in the Busch patent at column 94 lines 10 et seq. In the course of the callback operation marker 8 tests the called line for a busy or idle status. Assume for the purpose of explanation that station 1 is the called station.

Marker 8 proceeds to perform a busy test on station set 1 and line 2 by operating contact LGO in line link frame 3. When contact LGO is operated sleeve lead S is extended via line link connector 9 and contact NT5 to terminal S of sleeve repeater circuit 14 of the present invention. If station set 1 is idle, circuitry (not shown) in lockout circuit 5 will cause switch 51 to be open (as described in application Ser. No. 412,635), and sleeve lead S will be held at negative battery potential via the circuit consisting of sleeve lead S, the winding of hold megnet LHOO, terminal A, resistor 52 and negative battery.

Sleeve repeater circuit 14 is advantageously designed to convert idle signals appearing on sleeve lead S which signals may be of varying potential due to resistor 52 and the leakage resistance of line 2 in the sleeve circuit to standard negative battery signals recognized by busy and idle test relays LBT and LIT.

Figure 2:
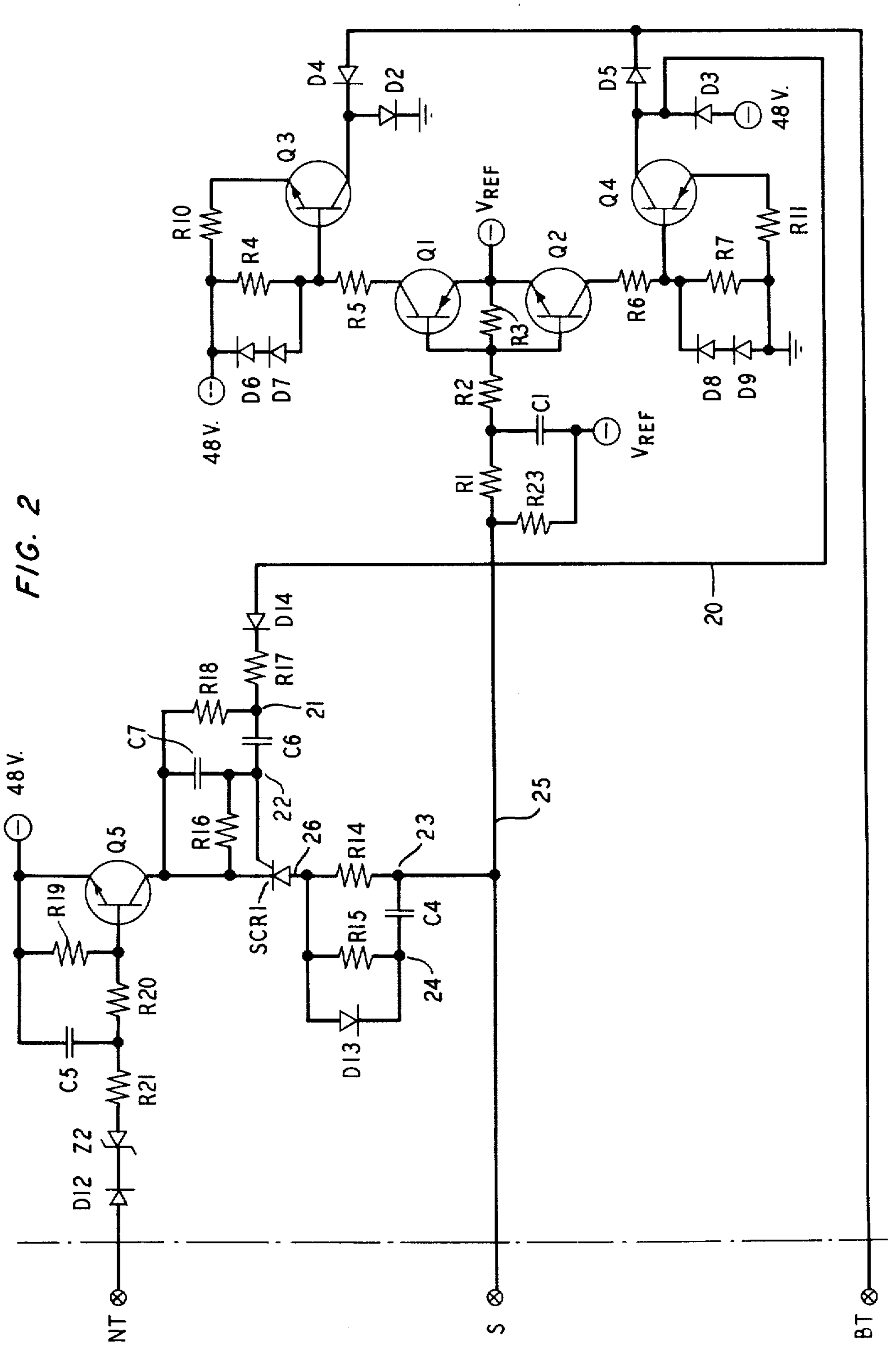
FIG. 2 of the drawing discloses a specific illustrative embodiment of the interface circuit which is to be incorporated into the crossbar switching system of FIG. 1.

Specifically, referring now to FIG. 2 (which shows sleeve repeater circuit 14 in detail) the negative battery signal appearing at terminal S of sleeve repeater circuit 14 is less than reference voltage $V_{REF}$ and causes transistor Q1 to turn on via resistors R1 and R2. Transistor Q1 is normally biased off by resistor R3 operating in conjunction with resistors R1, R2, and R23. Transistor Q1 thereupon turns on transistor Q3 via resistor R5. Transistor Q3 is normally biased off by resistor R4. Transistor Q3 connects output terminal BT of the circuit to negative battery potential via resistor R10 and diode D4. Therefore, negative battery potential is forwarded through the circuit as a standard negative battery signal.

If station set 1 is busy, line 2 will be connected to a trunk circuit, e.g., trunk circuit 7, via switching circuitry in line link frame 3 and trunk link frame 6. Sleeve lead S will be grounded by a circuit consisting of crosspoint switches in frames 3 and 6, contact S1, 10Ω resistor B and ground in trunk circuit 7.

The busy ground signal appears at sleeve terminal S of sleeve repeater circuit 14 via contact LGO, line link connector 9 and contact NT5. The busy ground signal is higher in potential than reference voltage $V_{REF}$ and accordingly turns on transistor Q2 (which is normally biased off by resistor R3 in conjunction with resistors R1, R2, and R23 via resistors R1 and R2. Transistor Q2 in turn turns on transistor Q4 via resistor R6. Transistor Q4 is normally biased off by resistor R7. Transistor Q4 connects the output terminal BT to ground via resistor R11 and diode D5. Therefore a busy ground signal is also forwarded through the sleeve repeater circuit.

Referring now to FIG. 1, marker 8 is informed of the busy or idle status of line 2 by the operation of relay LBT or relay LIT. In particular, a busy ground signal appearing at the terminal BT of sleeve repeater circuit 14 operates polarized relay LBT via a circuit consisting of terminal BT, the winding of relay LBT, the winding of relay LIT, and resistor LBT to negative battery. The operation of relay LBT informs marker 8 that line 2 is busy. if line 2 were idle, on the other hand, negative battery potential would appear on terminal BT of sleeve repeater circuit 14 as previously described. In this case polarized relay LIT would operate via the path consisting of terminal BT, the winding of relay LBT, the winding of relay LIT, resistor LIT, and ground. The operation of relay LIT informs marker 8 that line 2 is in the idle condition. Marker 8 would thereupon proceed to test and set up connections between trunk circuit 7 and called station 1 via trunk link frame 6 and line link frame 3 as described at column 89 lines 5 et seq. of the aforementioned Busch patent.

In addition, if sleeve lead S is "open" (not connected to battery or ground potential) due to a trouble condition, of example, a malfunction in line link frame 3, sleeve repeater circuit 14 is advantageously adapted to forward this open condition to marker 8 to enable marker 8 to take appropriate corrective action. In particular, when sleeve lead S is open neither battery or ground potential appears at terminal S of FIG. 2. Transistors Q1 and Q2 are held off by resistor R3. Transistors Q3 and Q4 are in turn held off by transistors Q1 and Q2 respectively, thus output terminal BT is not connected to either ground or negative battery potential. Since terminal BT is "open" neither relay LBT nor relay LIT operates in marker 8 shown in FIG. 1. After a predetermined time marker 8 times out in a well-known manner and makes a trouble report to indicate a mulfunction on line 2.

It is desirable during the operation of the switching system shown in FIG. 1 to be able to make test calls to lines such as line 2 regardless of whether the line is busy or idle. Such calls are typically termed no-test calls and are initiated when maintenance or test personnel access a no-test trunk such as no-test trunk 11 from a maintenance location. The circuitry of no-test trunk 11 is shown in FIGS. 182 and 183 and described at column 209 lines 14 et seq. in the aforementioned Busch patent.

When no-test trunk 11 is seized relay F (not shown) operates to close contact F which in turn grounds lead NT. The ground on lead NT is forwarded via trunk link connector 12 to the switching system marker 8 which is equipped with no-test circitry 13 to handle no-test calls. Marker 8 thereupon responds to the ground on lead NT by operating relay NT via an obvious circuit path. The operation of relay NT initiates a series of operations in the course of which the line to be tested is checked to determine its busy or idle state. Assume that maintenance personnel desire to complete a call from no-test trunk 11 to line 2. Marker 8 tests line 2 for a busy or idle status by means of the operations previously described. If the busy or idle signal on line 2 is a normal busy or idle signal, that is, caused by a busy or idle condition of station set 1 and is not a permanent signal busy condition, no-test circuitry 13 in marker 8 operates to connect no-test trunk 11 to line 2. Specifically, if line 2 is idle (as indicated by the operation of relay LIT) marker 8 proceeds to test and set up connections between no-test trunk 11 and line 2 via the normal switching paths in trunk line frame 6 and line link frame 3. If however, line 2 is busy (as indicated by the operation of relay LBT) marker 8 cannot set up connections between trunk 11 and line 2 via the normal switching paths because these paths are already in use.

Assume, for example, that line 2 is busy and is connected to trunk circuit 7 via junctor 40 of line switch 4 in line link frame 3 and trunk line 6. In order to connect no-test trunk 11 to line 2, marker 8 first performs operations for identifying to which of junctors 40–49 in line switch 4 line 2 is connected. In particular, marker 8 operates relays NT5 and NTT (not shown). Operated relay NT5 opens contacts NT5 disconnecting sleeve repeater circuit 14 from sleeve lead S. Operated relay NTT connects 10-volt source 131 to sleeve lead S. Ten-volt source 131 produces a 10 volt pulse which appears on junctor 40 via the path consisting of contact NTT, sleeve lead S, line link connector 9, contact LGO, and the crossbar switch contacts of line switch 4. The 10 volt pulse appearing on junctor 40 also appears on lead LLO of leads LLO through LL9 which are connected to the sleeve leads in each of junctors 40–49. The 10 volt pulse operates relay LFO in no-test circuitry 13 via lead LLO and line link conector 9. The operation of relay LFO informs marker 8 that line 2 is connected to junctor 40. Marker 8 then proceeds to operate the appropriate select and hold magnets (not shown) to connect no-test trunk 11 via no-test connector 10 to the no-test vertical in line switch 4. Test personnel may then access line 2 via no-test trunk 11 to perform necessary tests.

However, if line 2 is in a permanent signal busy condition, switch 51 is lockout circuit 5 will be opened by circuit operations described in detail in my copending application Ser. No. 412,635. In addition, as described in application Ser. No. 412,635, during a permanent signal condition, line switch 4 remains unoperated. When switch 51 is opened during a permanent signal condition, a high resistance ground appears on sleeve lead S via the path consisting of sleeve lead S, winding of hold magnet LHOO, the winding of line relay LOO, contact LH-1, ring lead R, the permanent signal off-hook in station set 1, tip lead T, contact LH-2, and ground. Therefore line 2 appears busy to marker 8. When a no-test call is attempted to line 2 during a permanent signal condition, marker 8 will in the course of the normal no-test operations test line 2 to determine whether it is busy or idle and will, of course, determine line 2 to be busy. Marker 8 upon determining that line 2 is busy will attempt to identify to which of junctors(40 through 49) line 2 is connected. However this identification test will fail, because the circuitry in line switch 4 is not operated during a permanent signal condition due to the operation of lockout circuit 5 as described in copending application Ser. No. 412,635.

To prevent marker 8 from recycling and producing trouble reports and to permit marker 8 to successfully complete connections to line 2, when attempting no-test calls to lines in permanent signal conditions, sleeve repeater circuit 14 in FIG. 1 advantageously contains circuitry which makes a permanent signaling line appear as an idle line when a no-test call is attempted. Specifically, referring to FIG. 1, when a no-test call is initiated lead NT is grounded by contact F in no-test trunk 11 as previously described. This ground appears at terminal NT of sleeve repeater circuit 14 via a circuit consisting of contact F in no-test trunk 11, trunk link connector 12 and terminal NT. Referring now to FIG. 2, ground on terminal NT turns on transistor Q5 (which is normally biased off by resistor R19) via diode D12, zener diode Z2, resistor R21 and resistor R20. Transistor Q5 thereupon connects the cathode of silicon control rectifier SCR1 to negative battery enabling device SCR1 to be triggered into the conductive state as hereinafter described. In addition, negative battery potential appears at the righthand lead 21 of capacitor C6 via resistor R18 and at the lefthand lead 22 of capacitor C6 via resistor R16. Capacitor C6 is thus discharged.

Assume that line 2 is the line which is to be tested. If line 2 is in a permanent signal condition, a high resistance ground is present on sleeve lead S as previously described. During no-test operations marker 8 in FIG. 1 connects sleeve lead S associated with line 2 to sleeve repeater circuit 14 by means of contact NT5 in order to perform a test on line 2 to determine its busy or idle status. When sleeve lead S is connected to sleeve repeater circuit 14 the high resistance ground on sleeve lead S is forwarded via connector LGO in line link frame 3, line link connector 9 and contact NT5 to terminal S of sleeve repeater circuit 14. The ground signal on terminal S turns on transistor Q2, shown in FIG. 2, through lead 25 and resistors R1 and R2. Transistor Q2 in turn turns on transistor Q4 through resistor R6 as previously described. As transistor Q4 turns on its collector is connected to ground via resistor R11. When ground potential appears on the collector of transistor Q4, capacitor C6 begins charging through the circuit consisting of the collector of transistor Q4, lead 20, diode D14, resistor R17, capacitor C6, the gate of device SCR1, and conductive transistor Q5 to negative battery. Sufficient current flows into the gate electrode of device SCR1 to trigger the device SCR1 into its conducting state. Device SCR1, in the conducting state, connects resistor R14 to negative battery potential through conductive transistor Q5. In addition, when device SCR1 is triggered into the conducting state capacitor C4 is connected, through resistor R15, conducting device SCR1, and conductive transistor Q5 to negative battery potential. Capacitor C4 therefore charges to the potential across resistor R14. Capacitor C4 is used to turn off device SCR1 as will be hereinafter described.

if the called line is in a permanent signal condition, the high resistance ground present on sleeve lead S is connected to negative battery by resistor R14 and current flowing through resistor R14 and the high grounding resistance causes the potential on sleeve lead S to decrease to below reference voltage $V_{REF}$. The decrease in potential on sleeve lead S turns off transistors Q2 and Q4 and turns on transistors Q1 and Q3 via resistors R1 and R2. The output terminal BT is therefore switched from ground to negative battery. Advantageously, this switch from ground to negative battery occurs before busy test relay LBT in marker 8 of FIG. 1 can operate. Subsequently, relay LIT in marker 8 operates via the circuit consisting of terminal BT, winding of relay LBT, the winding of relay LIT, resistor LIT, and ground. Operated relay LIT informs marker 8 that the called line is idle. Marker 8 accordingly sets up connections between no-test trunk 11 and line 2 via trunk link frame 6 and line link frame 3.

If, on the other hand, called line 2 is in a normal busy state, a low resistance ground is present on sleeve lead S. This ground triggers device SCR1 (FIG. 2) in the same manner as previously described for permanent signal conditions. However, when resistor R14 is connected from sleeve lead S to negative battery the current flowing through the grounding resistance and R14 does not appreciably change the potential on sleeve lead S from ground because of the low grounding resistance. Consequently, transistors Q2 and Q4 remain turned on causing a busy ground signal to appear at terminal BT. Subsequently, relay LBT (FIG. 1) operates as previously described to inform marker 8 that called line 2 is busy. Marker 8 thereupon prepares to identify to which of junctors 40–49 line 2 is connected as previously described. During this operation marker 8 operates relay NT5 (not shown) to open contact NT5 disconnecting sleeve repeater circuit 14 from sleeve lead S. When this happens ground is removed from terminal S in FIG. 2. The potential on lead 25 abruptly begins to decrease due to the charge stored on capacitor C1 (this charge was stored on capacitor C1 when lead 25 was grounded through terminal S). However, capacitor C4 is charged at this time as previously described. Therefore the potential across capacitor leads 23 and 24 is momentarily fixed since capacitor C4 cannot discharge immediately. As the potential on lead 25 decreases, the potential on capacitor 24 decreases, in turn decreasing the potential at anode 26 of device SCR1 by means of diode D13. Device SCR1 becomes momentarily back-biased causing it to turn off and revert ot its nonconducting state. The turn-off device SCR1 prevents the output BT from changing quickly to an idle induçtion from a busy indication when sleeve lead S is disconnected from terminal S after a busy called line has been detected. When device SCR1 turn off, transistors Q1 and Q2 are turned off by resistor R3. Transistors Q3 and Q4 are held off by transistors Q1 and Q2 respectively. The output terminal BT is thus in the "open" condition. Later at the termination of the no-test call, ground potential is removed from terminal NT in FIG. 2. Transistor Q5 is thereupon truned off by resistor R19 and sleeve repeater circuit 14 returns to its idle state.

In the preferred embodiment of the sleeve repeater circuit as shown in FIG. 2, various components have been added to reduce the effect of noise on proper circuit operation and to protect the component devices from damage due to electrical transients. In particular, diode D12 and zener diode Z2 have been added in the base circuit of transistors Q5 to prevent noise transients from improperly operating transistor Q5. Capacitor C5 forms a noise filter with resistors R21 and R20. In addition, capacitor C7 prevents noise transients from improperly operating device SCR1 via its gate circuit. Capacitor C1 forms a noise filter with resistors R1 and R2 to prevent noise transients from being forwarded to output terminal BT. Protection is provided for transistor Q3 by diodes D2, D4, D6, and D7 and resistor R10. Diodes D3, D5, D8, and D9 and resistor R11 similarly protect transistor Q4.

In one specific illustrative embodiment, the following component values may be used: C1=2 μF, C4=0.47 μF, C5=1 μF, C6=1 μF, C7=0.1 μF, R1=5100 Ω, R2=5100 μ, R3=10,000 μ, R4=10,000 μ, R5=22,000 μ, R6=8,200 Ω, R7=10,000 Ω, R10=33 Ω, R11=18 Ω, R14=2,000 Ω, R15=2,200 Ω, R16=1,000 Ω, R17=22,000 Ω, R18=47,000 Ω, R20=2,700 Ω, R21=12,000 Ω, R23=22,000 Ω. In addition, REFREF =−20 volts.

What is claimed is:

1. For use in a telephone switching system having circuitry which produces a low impedance ground on the sleeve lead during a normal busy condition and a high impedance ground on said sleeve lead during a permanent signal busy condition, a marker having no-test circuitry for accessing lines to check for trouble conditions thereof, a line busy relay to determine whether said lines are busy or idle, and a source of potential, the combination comprising:

an impedance connected to said sleeve lead, latch switch means, means responsive to a no-test call for enabling said latch switch means, means responsive to a busy ground on said sleeve lead for triggering said enabled latch switch means and connecting said impedance to said source of potential, and output means for forwarding a normal busy signal to said marker when said busy ground is a normal low impedance busy ground, but for switching said normal busy signal to an idle signal in a time insufficient to operate said line busy relay when said busy ground is a high impedance permanent signal ground.

2. The combination of claim 1 wherein said latch switch means and said enabling means are connected in series and said latch switch means connects said impedance to said source of potential through said enabling means.

3. The combination of claim 2 wherein said latch switch means is a silicon controlled rectifier.

4. The combination of claim 1 further comprising means for disabling said latch switch means during a normal busy condition when said low impedance ground on said sleeve lead is removed.

5. In a crossbar switching system having circuitry which grounds a sleeve lead through a low impedance during a normal busy condition and grounds said sleeve lead through a high impedance during a permanent signal busy condition, a marker including a busy test relay connected to said grounding circuitry to monitor the status thereof and a source of potential, an interface circuit for insertion in series with said grounding circuitry and said busy test relay, said interface circuit comprising, a shunt impedance connected to said sleeve lead, means responsive to a no-test call from siad marker in conjunction with a high impedance ground or a low impedance ground on said sleeve lead for connecting said shunt impedance to said source of potential to form an impedance divider between said shunt impedance and said high and said low impedance grounds, and means responsive to the ratio of said shunt impedance and said low impedance ground for forwarding said normal busy signal to said busy test relay and responsive to the ratio of said shunt impedance and said high impedance ground for switching said normal busy signal to an idle signal before said busy test relay can respond to said normal busy signal.

6. In a crossbar switching system an interface circuit according to claim 5 wherein said connecting means comprises first switch means triggered by either said high impedance ground or said low impedance ground on said sleeve lead and second switch means enabled in response to said no-test call to connect said shunt impedance to said source of potential.

7. In a crossbar switching system according to claim 5 having further circuitry which connects said sleeve lead to said source of potential through a high impedance during an idle condition and an idle test relay, wherein said interface circuit further comprises, means responsive to the connection of said source of potential to said sleeve lead for applying an idle signal to said idle test relay.

8. In a crossbar switching system having circuitry which grounds a sleeve lead through a low impedance during a normal busy condition and grounds said sleeve lead through a high impedance during a permanent signal busy condition, a marker including a busy test relay connected to said grounding circuitry to monitor the status thereof and a source of potential, an interface circuit for insertion in series with said grounding circuitry and said busy test relay, said interface circuit comprising, a resistor having first and second terminals said first terminal being connected to said sleeve lead, a silicon controlled rectifier having anode, cathode and gate terminals, said anode terminal being connected to said second terminal of said resistor, a transistor having a collector terminal connected to said cathode of said silicon controlled rectifier, an emitter terminal connected to said source of potential and a base terminal connected to said marker for receiving a no-test initiating signal, said transistor being rendered conductive by said no-test signal to enable said silicon controlled rectifier, and transistor means having an input and an output connected to said gate terminal of said silicon controlled rectifier and to said busy test relay, said transistor means being responsive to a high impedance ground or a low impedance ground on said sleeve lead for grounding said output to operate said busy test relay and to trigger said silicon controlled rectifier to connect said resistor to said source of potential through said silicon controlled rectifier and said transistor, said transistor means being thereupon responsive to the ratio of said low impedance and said resistor for grounding said output and being responsive to the ratio of said high impedance and said resistor for removing the ground from said output before said busy test relay can operate.

9. For use in a telephone switching system having circuitry which produces a low impedance ground on the sleeve lead during a normal busy condition and a high impedance ground on the sleeve lead during a permanent signal busy condition, a marker having no-test circuitry, relay means responsive to busy or idle signals, and a source of potential, a sleeve repeater circuit comprising an impedance connected to the sleeve lead, means responsive to ground on said sleeve lead and to said no-test circuitry for connecting said sleeve lead through said impedance to said source of potential, and output means connected to said relay means and responsive to the potential at the connection of said sleeve lead to said impedance for applying busy or idle signals to said relay means.

10. For use in a telephone system, a sleeve repeater circuit in accordance with claim 9 wherein said output means comprises first transistor means for connecting a first potential signal to said relay means as an idle signal and a second transistor means for connecting a second potential signal to said relay means as a busy signal and said connecting means includes switch means responsive to said second potential signal.

11. For use in a telephone system, a sleeve repeater circuit in accordance with claim 10 wherein said connecting means further includes a transitor connected to said no-test circuitry and in series with said switch means.

* * * * *